(12) United States Patent
Kuroda

(10) Patent No.: US 7,865,284 B2
(45) Date of Patent: Jan. 4, 2011

(54) ANGULAR VELOCITY SENSOR AND TRANSPORTING EQUIPMENT

(75) Inventor: Keisuke Kuroda, Osaka (JP)

(73) Assignee: Panasonic Corporation, Osaka (JP)

( * ) Notice: Subject to any disclaimer, the term of this patent is extended or adjusted under 35 U.S.C. 154(b) by 1108 days.

(21) Appl. No.: 11/587,352

(22) PCT Filed: Apr. 19, 2005

(86) PCT No.: PCT/JP2005/007429

§ 371 (c)(1),
(2), (4) Date: Oct. 23, 2006

(87) PCT Pub. No.: WO2005/103726

PCT Pub. Date: Nov. 3, 2005

(65) Prior Publication Data

US 2007/0233347 A1    Oct. 4, 2007

(30) Foreign Application Priority Data

Apr. 21, 2004    (JP) .............................. 2004-125205

(51) Int. Cl.
*B60R 22/00*    (2006.01)
(52) U.S. Cl. ...................................................... 701/45
(58) Field of Classification Search .................... 701/45
See application file for complete search history.

(56) References Cited

U.S. PATENT DOCUMENTS 4,034,276 A * 7/1977 Hyatt .......................... 318/608

5,615,093 A * 3/1997 Nalbant ....................... 363/25
5,923,151 A * 7/1999 Satoh .......................... 322/28

FOREIGN PATENT DOCUMENTS

| EP | 1 122 514 | 8/2001 |
|----|-----------|--------|
| EP | 1 167 922 | 1/2002 |
| JP | 62-110173 | 5/1987 |
| JP | 8-97365 | 4/1996 |
| JP | 8-327363 | 12/1996 |
| JP | 10-288647 | 10/1998 |
| JP | 2001-56224 | 2/2001 |
| JP | 2002-13930 | 1/2002 |

* cited by examiner

*Primary Examiner*—Khoi Tran
*Assistant Examiner*—Kyung J Kim
(74) *Attorney, Agent, or Firm*—Wenderoth, Lind & Ponack, L.L.P.

(57) ABSTRACT

Each output from an angular-velocity detecting element (2) and first and second signal processing sections (21, 22) is supplied to each input terminal of a switch circuit (7) having input terminals of a number corresponding to the number of the outputs, and an output terminal of the switch circuit (7) is connected to an output terminal (4). The connection state of the switch circuit (7) is switched, corresponding to a mode signal outputted from a mode-signal generation circuit (8), one output is selected out of the outputs from the angular-velocity detecting element 2 and the first and the second signal processing sections (21, 22), and the selected output is supplied to the output terminal (4).

12 Claims, 5 Drawing Sheets

ANGULAR VELOCITY SENSOR AND TRANSPORTING EQUIPMENT

TECHNICAL FIELD

The present invention relates to an angular velocity sensor which detects an angular velocity, and transporting equipment in which this angular velocity sensor is used.

BACKGROUND ART

Among conventional angular velocity sensors, there is the one which is described, for example, in Patent Document 1. FIG. 5 is a block diagram, showing the configuration of the conventional angular velocity sensor described in Patent Document 1.

An angular velocity sensor 101 shown in FIG. 5 includes an angular-velocity detecting element 102, a drive circuit 103, a detection circuit 104, an output terminal 107, a decision unit 108, and a monitor signal terminal 109. The detection circuit 104 is provided with a first signal processing section 105 and a second signal processing section 106.

The drive circuit 103 drives the angular-velocity detecting element 102. The first signal processing section 105 and the second signal processing section 106 process a signal obtained from the angular-velocity detecting element 102 which moves according to an applied angular velocity. The second signal processing section 106 outputs an angular-velocity signal obtained by this processing to the output terminal 107. The decision unit 108 monitors a signal at a connection point N1 of the first signal processing section 105 and the second signal processing section 106. Then, it decides whether the signal of the connection point N1 is abnormal or not, and outputs a signal which indicates the decision result to the monitor signal terminal 109.

However, in the above described conventional angular velocity sensor 101, a signal is monitored only at the connection point N1 of the first signal processing section 105 and the second signal processing section 106. Hence, a decision cannot be made whether or not a signal is abnormal at a large number of points inside of the angular velocity sensor 101.

Furthermore, in order to monitor an abnormality in the signal of each point in the angular velocity sensor 101 while simultaneously specifying where it is located, monitor signal terminals are required which correspond to the number of numerous points. If a great number of monitor signal terminals are provided, an angular velocity sensor becomes larger. This makes it difficult to miniaturize an angular velocity sensor for integration.

Patent Document 1: Japanese Patent Laid-Open No. 8-327363 Specification

DISCLOSURE OF THE INVENTION

It is an object of the present invention to provide an angular velocity sensor and transporting equipment with this angular velocity sensor which are capable of monitoring signals at many points inside of the angular velocity sensor while specifying where they are located, and making the angular velocity sensor smaller so that such sensors can be integrated.

An angular velocity sensor according to an aspect of the present invention, including: an angular-velocity detecting element; a drive circuit which drives the angular-velocity detecting element; a detection circuit which processes a detection signal outputted from the angular-velocity detecting element according to an applied angular velocity and creates an angular-velocity signal; an output terminal; a switch circuit which is connected between a plurality of signal output sections inside of the angular velocity sensor and the output terminal; and a control circuit which controls the connection operation of the switch circuit, the switch circuit connecting, to the output terminal, a signal output section selected out of the plurality of signal output sections according to a control signal of the control circuit.

In this angular velocity sensor, a signal can be monitored at each of numerous points inside of it, while the places in which they are located being specified. At the same time, the sensor itself becomes smaller so that the integration of such sensors can be achieved.

Transporting equipment according to another aspect of the present invention, including: the above described angular velocity sensor; and a control unit which decides whether an output signal from a plurality of points inside of the angular velocity sensor is abnormal, and if deciding that the output signal is normal, controls the angular velocity sensor so that an angular-velocity signal of the angular velocity sensor is supplied to the output terminal.

In this transporting equipment, the control unit decides whether an output signal from a plurality of points inside of the angular velocity sensor is abnormal. Then, if deciding that the output signal is normal, it supplies an angular-velocity signal of the angular velocity sensor to the output terminal. Hence, there is no need to provide a processing circuit which decides whether an output signal is normal or not, separately in the angular velocity sensor. This makes it possible to miniaturize the sensor itself and integrate such sensors. In addition, based on information obtained by monitoring signals at a great number of points inside of the angular velocity sensor while specifying their locations and angular-velocity information of the angular velocity sensor, the transporting equipment can be variously controlled. This helps make the transporting equipment itself more reliable.

BEST MODE FOR IMPLEMENTING THE INVENTION

Hereinafter, each embodiment of the present invention will be described with reference to the attached drawings.

First Embodiment

Figure 1:
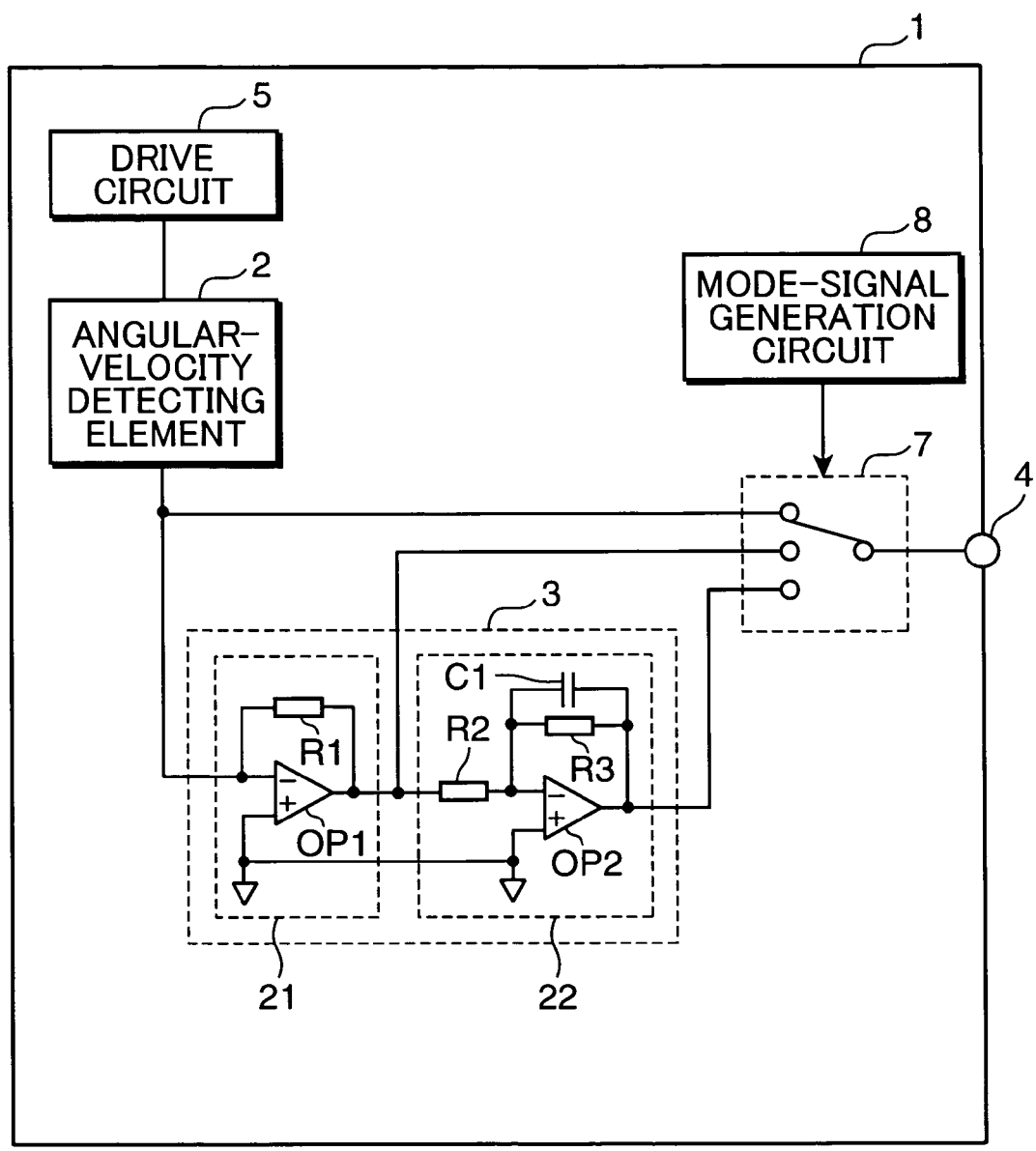
FIG. 1 is a block diagram, showing the configuration of an angular velocity sensor according to a first embodiment of the present invention.

FIG. 1 is a block diagram, showing the configuration of an angular velocity sensor according to a first embodiment of the present invention. An angular velocity sensor 1 shown in FIG. 1 includes an angular-velocity detecting element 2, a detection circuit 3, a single output terminal 4, a drive circuit 5, a switch circuit 7, and a mode-signal generation circuit 8. The detection circuit 3 is provided with two first and second signal processing sections 21, 22. The number of signal processing sections provided in the detection circuit 3 is not limited especially to this example. Thus, one, or three or more, signal processing sections may also be provided.

The angular-velocity detecting element 2 is formed, for example, by an MEMS (or micro electro mechanical systems) element which has a U-shape (or tuning-fork shape) or an H-shape. It oscillates an oscillatory fork on the basis of Coriolis' force and detects an angular velocity in the directions perpendicular to the oscillation directions. Herein, the MEMS generically represents a micro-sized sensor or actuator using a micromachining technology based on an integrated-circuit fabrication process, and a microscopic system obtained by integrating control circuits. Using this MEMS technology, a thin piezo-electric film is formed on a silicon substrate and is worked into a U-shape or an H-shape. Thereby, an MEMS element is formed. Such an angular-velocity detecting element is not limited especially to this example. Thus, various angular-velocity detecting elements can also be used which are made of crystal, elinvar, piezo-electric ceramic and the like.

The drive circuit 5 drives the angular-velocity detecting element 2. The angular-velocity detecting element 2 is connected to the first signal processing section 21. Then, it outputs a detection signal which corresponds to the greatness of an applied angular velocity to the first signal processing section 21 and the switch circuit 7.

The first signal processing section 21 gives a predetermined signal processing to the detection signal of the angular-velocity detecting element 2. Then, it outputs the signal which has undergone this signal processing to the second signal processing section 22 and the switch circuit 7. As the first processing circuit section 21, for example, a current-voltage conversion circuit is used which is given an input of an electric charge generated by the angular-velocity detecting element 2 according to an angular velocity applied to the angular velocity sensor 1, and that converts an electric current based on this electric charge into a voltage. In this case, the first processing circuit section 21 is made up, as shown in the figure, of a first operational amplifier OP1 and a first resistor R1. To the positive input terminal of the first operational amplifier OP1, a predetermined reference voltage is applied, and one terminal of the angular-velocity detecting element 2 and the first resistor R1 is connected to the negative input terminal of the first operational amplifier OP1. Then, the other terminal of the first resistor R1 is connected to the output terminal of the first operational amplifier OP1. Incidentally, the example of a signal processing by such a first signal processing section is not limited especially to the above described example. Thus, another processing which is executed in the angular velocity sensor 1 may also be conducted.

The second signal processing section 22 gives a predetermined signal processing to the output signal of the first processing circuit section 21. Then, it outputs the signal which has been subjected to this signal processing to the switch circuit 7. As the second signal processing section 22, for example, a low-pass filter is used which is given an input of a detection signal converted into the voltage which corresponds to the greatness of an angular velocity by the first processing circuit section 21. In this case, the second signal processing section 22 is made up, as shown in the figure, of a second operational amplifier OP2, a second resistor R2, a third resistor R3 and a first capacitor C1. To the positive input terminal of the second operational amplifier OP2, the above described predetermined reference voltage is applied, and the output terminal of the first operational amplifier OP1 is connected via the second resistor R2 to the negative input terminal of the second operational amplifier OP2. Then, one terminal of the third resistor R3 is connected to the negative input terminal of the second operational amplifier OP2 while the other terminal is connected to the output terminal of the second operational amplifier OP2. In the first capacitor C1, one terminal is connected to the negative input terminal of the second operational amplifier OP2 while the other terminal is connected to the output terminal of the second operational amplifier OP2. Incidentally, the example of a signal processing by such a second signal processing section is not limited especially to the above described example. Thus, another processing which is executed in the angular velocity sensor 1 may also be conducted.

Each input terminal of the switch circuit 7 is connected to each signal output section of the angular-velocity detecting element 2 as well as the first and second signal processing sections 21, 22. The output terminal of the switch circuit 7 is connected to the output terminal 4. The mode-signal generation circuit 8 is connected to the switch circuit 7. Among the outputs of the angular-velocity detecting element 2 and the first and second signal processing sections 21, 22, it outputs, to the switch circuit 7, a mode signal which is a control signal for giving an instruction which output to choose. In accordance with this mode signal, the switch circuit 7 selects one output out of the three outputs of the angular-velocity detecting element 2 and the first and second signal processing sections 21, 22. Then, it outputs this output to the output terminal 4.

Figure 2:
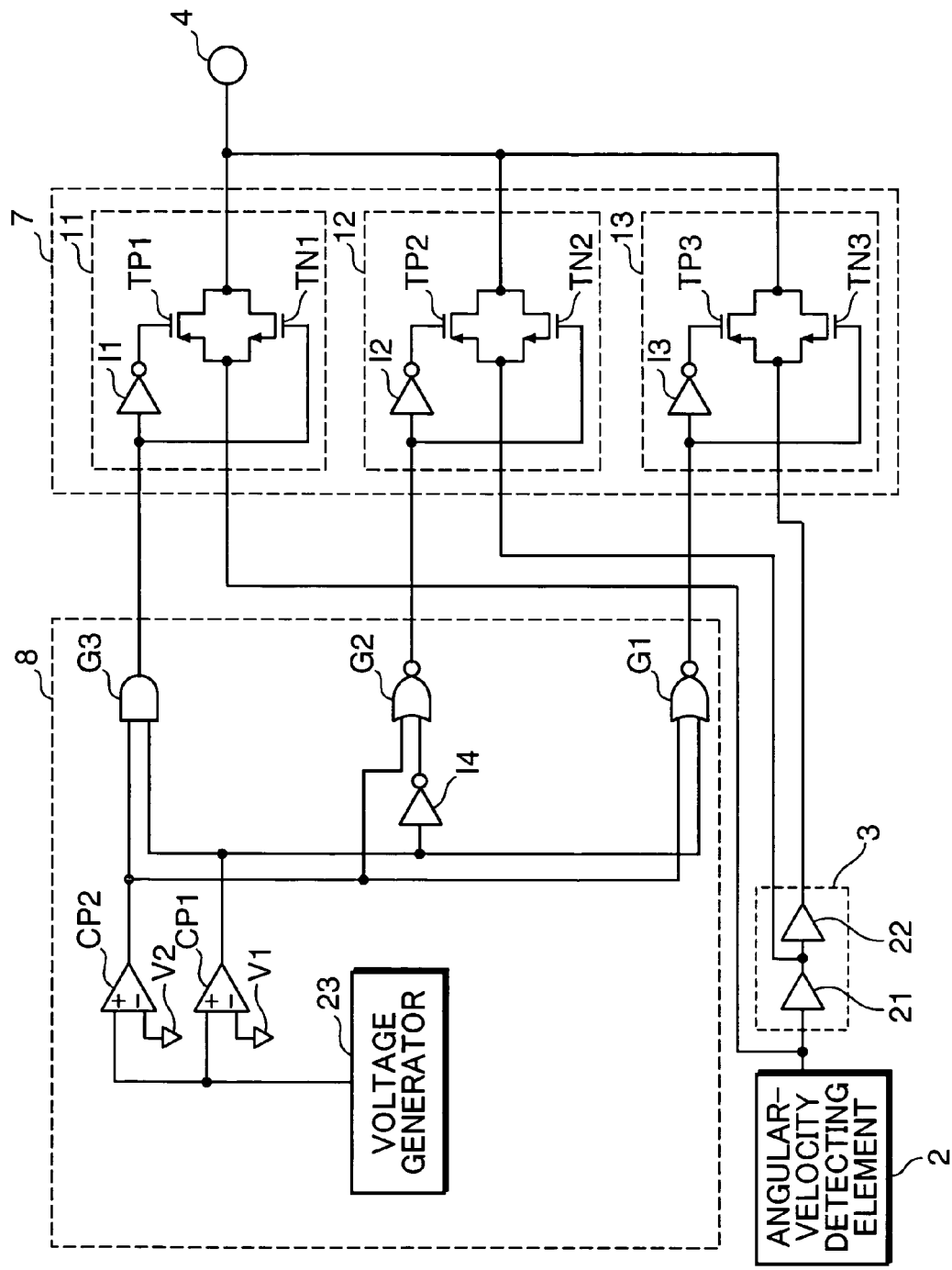
FIG. 2 is a circuit diagram, showing an example of the configuration of a mode-signal generation circuit and a switch circuit shown in FIG. 1.

Next, the mode-signal generation circuit 8 and the switch circuit 7 which are the main parts of the angular velocity sensor 1 shown in FIG. 1 will be described in further detail. FIG. 2 is a circuit diagram, showing an example of the configuration of the mode-signal generation circuit 8 and the switch circuit 7 shown in FIG. 1. In FIG. 2, in order to simplify this figure, only operational amplifiers are shown as the first and second signal processing sections 21, 22.

As shown in FIG. 2, the switch circuit 7 is formed by first to third switches 11 to 13. The first switch 11 is made up of a first P-channel transistor TP1, a first N-channel transistor TN1 and a first inverter I1. The signal output section of the angular-velocity detecting element 2 is connected to the source of the first P-channel transistor TP1 and the source of the first N-channel transistor TN1. The output terminal 4 is connected to the drain of the first P-channel transistor TP1 and the drain of the first N-channel transistor TN1. In the first inverter I1, its input terminal is connected to the gate of the first N-channel transistor TN1 while the output terminal is connected to the gate of the first P-channel transistor TP1.

The second switch 12 is made up of a second P-channel transistor TP2, a second N-channel transistor TN2 and a second inverter 12. The signal output section of the first signal processing section 21 is connected to the source of the second P-channel transistor TP2 and the source of the second N-channel transistor TN2. The output terminal 4 is connected to the drain of the second P-channel transistor TP2 and the drain of the second N-channel transistor TN2. In the second inverter 12, its input terminal is connected to the gate of the second N-channel transistor TN2 while the output terminal is connected to the gate of the second P-channel transistor TP2.

The third switch 13 is made up of a third P-channel transistor TP3, a third N-channel transistor TN3 and a third inverter 13. The signal output section of the second signal processing section 22 is connected to the source of the third P-channel transistor TP3 and the source of the third N-channel transistor TN3. The output terminal 4 is connected to the drain of the third P-channel transistor TP3 and the drain of the third N-channel transistor TN3. In the third inverter 13, its input terminal is connected to the gate of the third N-channel transistor TN3 while the output terminal is connected to the gate of the third P-channel transistor TP3.

The mode-signal generation circuit 8 is formed by first and second comparators CP1, CP2, a voltage generator 23, first and second NOR gates G1, G2, a fourth inverter 14, and an AND gate G3.

The voltage generator 23 is connected to the positive input terminals of the first and second comparators CP1, CP2. A first reference voltage V1 is supplied to the negative input terminal of the first comparator CP1. On the other hand, a second reference voltage V2 higher than the first reference voltage V1 is supplied to the negative input terminal of the second comparator CP2.

In the first NOR gate G1, one input terminal is connected to the output terminal of the first comparator CP1 while the other input terminal is connected to the output terminal of the second comparator CP2. The output terminal of the first NOR gate G1 is connected to the input terminal of the third inverter 13 and the gate of the third N-channel transistor TN3.

In the second NOR gate G2, one input terminal is connected via the fourth inverter 14 to the output of the first comparator CP1. To the other input terminal, the output terminal of the second comparator CP2 is connected. The output terminal of the second NOR gate G2 is connected to the input terminal of the second inverter 12 and the gate of the second N-channel transistor TN2.

To one input terminal of the AND gate G3, the output terminal of the first comparator CP1 is connected, while the output terminal of the second comparator CP2 is connected to the other input terminal. To the output terminal of the AND gate G3, the input terminal of the first inverter I1 and the gate of the first N-channel transistor TN1 are connected.

Next, the operation of such an angular velocity sensor configured as described above will be described in further detail. As this sensor's operation modes, there are, for example, an ordinary mode of supplying an output of the second processing circuit section 22 to the output terminal 4, a processing-circuit section diagnostic mode of supplying an output of the first processing circuit section 21 to the output terminal 4, and an angular-velocity detecting-element diagnostic mode of supplying an output of the angular-velocity detecting element 2 to the output terminal 4. If the corresponding sensor is mounted, for example, on an automobile, each such mode is determined by an ECU (or electronic control unit: not shown). Then, the voltage generator 23 outputs a predetermined voltage which is set in advance for each mode according to a mode setting signal to be outputted from the ECU. Incidentally, how to determine each mode is not limited especially to this example, and thus, it can be variously changed. For example, periodic timing is created by counting a clock from an oscillation circuit (not shown) provided inside of the angular velocity sensor 1. In this periodic timing, each mode may also be automatically switched one after another.

First, in the ordinary operation mode, as a predetermined command voltage, a voltage VL lower than each first and second reference voltage V1, V2 is outputted from the voltage generator 23. Thereby, the outputs of the first and second comparators CP1, CP2 both become Low. Consequently, the output of the AND gate G3 becomes Low and the output of the first inverter I1 becomes High. Then, the first P-channel transistor TP1 is turned off and the first N-channel transistor TN1 is turned off. Thus, the signal output section of the angular-velocity detecting element 2 is cut off electrically from the output terminal 4.

Furthermore, the output of the fourth inverter 14 becomes High, the output of the second NOR gate G2 becomes Low, and the output of the second inverter 12 becomes High. Then, the second P-channel transistor TP2 is turned off and the second N-channel transistor TN2 is turned off. Thereby, the signal output section of the first signal processing section 21 is cut off electrically from the output terminal 4.

Moreover, the output of the first NOR gate G1 becomes High, and the output of the third inverter 13 becomes Low. Then, the third P-channel transistor TP3 is turned on and the third N-channel transistor TN3 is turned on. Thereby, the signal output section of the second signal processing section 22, in other words, the signal output section of the detection circuit 3, is connected electrically to the output terminal 4. Consequently, the angular-velocity signal of the corresponding sensor is outputted from the output terminal 4.

Next, there is a case where some failure can be caused in the corresponding sensor, and thus, a decision needs to be made which part is abnormal. In this case, if the processing-circuit section diagnostic mode is set, then the voltage generator 23 outputs, for example, as a predetermined command voltage, a voltage VM which is higher than the first reference voltage V1 and lower than the second reference voltage V2. Thereby, the output of the first comparator CP1 becomes High, and the output of the second comparator CP2 becomes Low. Consequently, the output of the fourth inverter 14 becomes Low, the output of the second NOR gate G2 becomes High, and the output of the second inverter 12 becomes Low. Then, the second P-channel transistor TP2 is turned on and the second N-channel transistor TN2 is turned on. Thereby, the signal output section of the first signal processing section 21 is connected electrically to the output terminal 4. Therefore, the signal inside of this sensor (i.e., the output signal of the first signal processing section 21) can be observed through the output terminal 4 from the outside of the sensor.

At this time, the output of the first NOR gate G1 becomes Low, and the output of the third inverter 13 becomes High. Then, the third P-channel transistor TP3 is turned off and the third N-channel transistor TN3 is turned off. Thereby, the signal output section of the second signal processing section 22, in other words, the signal output section of the detection circuit 3, is cut off electrically from the output terminal 4. In addition, the output of the AND gate G3 becomes Low and the output of the first inverter I1 becomes High. Then, the first P-channel transistor TP1 is turned off and the first N-channel transistor TN1 is turned off. Thus, the signal output section of the angular-velocity detecting element 2 is cut off electrically from the output terminal 4. Thereby, the other signal output sections than the signal output section of the first signal processing section 21 are cut off electrically from the output terminal 4. This makes it possible to precisely monitor the output of the first signal processing section 21.

Furthermore, if the angular-velocity detecting-element diagnostic mode is set, then the voltage generator 23 outputs, for example, as a predetermined command voltage, a voltage VH higher than each first and second reference voltage V1, V2. Thereby, the outputs of the first and second comparators CP1, CP2 both become High. Consequently, the output of the AND gate G3 becomes High and the output of the first inverter I1 becomes Low. Then, the first P-channel transistor TP1 is turned on and the first N-channel transistor TN1 is turned on. Thus, the signal output section of the angular-velocity detecting element 2 is connected electrically to the output terminal 4. Therefore, the signal inside of this sensor (i.e., the output signal of the angular-velocity detecting element 2) can be observed through the output terminal 4 from the outside of the sensor.

At this time, the output of the fourth inverter I4 becomes Low, the output of the second NOR gate G2 becomes Low, and the output of the second inverter I2 becomes High. Then, the second P-channel transistor TP2 is turned off and the second N-channel transistor TN2 is turned off. Thereby, the signal output section of the first signal processing section 21 is cut off electrically from the output terminal 4. In addition, the output of the first NOR gate G1 becomes Low, and the output of the third inverter I3 becomes High. Then, the third P-channel transistor TP3 is turned off and the third N-channel transistor TN3 is turned off. Thereby, the signal output section of the second signal processing section 22, in other words, the signal output section of the detection circuit 3, is cut off electrically from the output terminal 4. Thereby, the other signal output sections than the signal output section of the angular-velocity detecting element 2 are cut off electrically from the output terminal 4. This makes it possible to accurately monitor the output of the angular-velocity detecting element 2.

As described so far, the signal of each section inside of the angular velocity sensor 1 which is outputted to the output terminal 4 is changed in accordance with a mode signal inputted in the switch circuit 7 from the mode-signal generation circuit 8. Therefore, using such a single output terminal 4, many places inside of the angular velocity sensor 1 can be precisely monitored, pinpointing those places at the same time. Hence, there is no need to provide a dedicated monitor terminal in each signal output section. This offers great advantages in that such sensors become smaller so that they can be integrated, and that they have a greater capability in detecting malfunctions.

In this embodiment, an example is described in which a mode signal which is an instruction signal for selectively connecting any of the outputs of the angular-velocity detecting element 2 and the first and second signal processing sections 21, 22 to the output terminal 4 is set by comparing the level of a voltage generated from the voltage generator 23 with those of the first and second reference voltages V1, V2. However, the present invention is not necessarily limited to this. For example, the mode-signal generation circuit 8 is provided with an oscillator and a counter connected to this oscillator. Then, it can also be configured so that an output signal which forms a logical structure for operating the switch circuit 7 in a predetermined form is obtained from this counter.

Furthermore, the first to third switches 11 to 13 are each made up of a transistor. However, the present invention is not necessarily limited to this. Moreover, in the above described embodiment, an inverter is used for switching the first to third switches 11 to 13 from the state where they are turned on to the state where they are turned off, and vice versa. However, the present invention is not necessarily limited to this. In addition, in the above described embodiment, the first to third inverters I1 to I3 are connected to the side of the first to third P-channel transistors TP1 to TP3 of the first to third switches 11 to 13. However, conversely, such inverters can naturally be connected to the side of the first to third N-channel transistors TN1 to TN3.

Moreover, the angular velocity sensor 1 according to this embodiment is mounted on an automobile, and using an ECU mounted on the automobile as the transporting equipment, the angular velocity sensor 1's operation mode is switched among the angular-velocity detecting-element diagnostic mode in which an output of the angular-velocity detecting element 2 is outputted from the output terminal 4, the processing-circuit section diagnostic mode in which an output of the first processing circuit section 21 is outputted from the output terminal 4, and the ordinary mode in which an output of the second processing circuit section 22 is outputted from the output terminal 4. In this case, there is no need to provide a processing circuit which independently decides whether each output signal is normal or not in the angular velocity sensor 1. Besides, whether each output signal is normal can be confirmed, and control can be variously executed based on a normal output (i.e., the angular-velocity information) of the detection circuit 3. This makes the transporting equipment itself more reliable.

In addition, in this embodiment, an output of the second processing circuit section 22 is outputted from the output terminal 4. At this time, this output signal can also be temporarily accumulated in a memory (not shown) incorporated in the ECU. Then, if the decision is made that the output of the angular-velocity detecting element 2 and the output of the first and second signal processing sections 21, 22 are normal, the output of the second processing circuit section 22 accumulated in this memory is used as a regular signal of the angular velocity sensor 1.

Furthermore, in this embodiment, the focus is given to an example in which the angular-velocity detecting element 2 and the first signal processing section 21 of the angular velocity sensor 1 are precisely monitored. However, except for this, for example, as is not shown in any figure, the following signals can also be supplied to the output terminal 4, using the mode-signal generation circuit 8 and the switch circuit 7. Such signals include: a signal of the drive circuit 5 for the angular-velocity detecting element 2; a signal of an oscillation section inside of the drive circuit 5; a signal of a temperature sensor for correcting a signal obtained from the angular-velocity detecting element 2 according to an applied angular velocity (or in some cases, a diode characteristic inside of a processing IC is used.); information accumulated in a memory; a signal of an oscillation section for operating a logic circuit; or a signal inside of the first signal processing section 21 after passing through an amplifier of the angular-velocity detecting element 2. Particularly, if the temperature sensor or the oscillation section for operating a logic circuit is monitored, then when another sensor (e.g., an acceleration sensor) and these component elements are used together, a peculiar advantage can be produced in that this sensor becomes more reliable.

Second Embodiment

Figure 3:
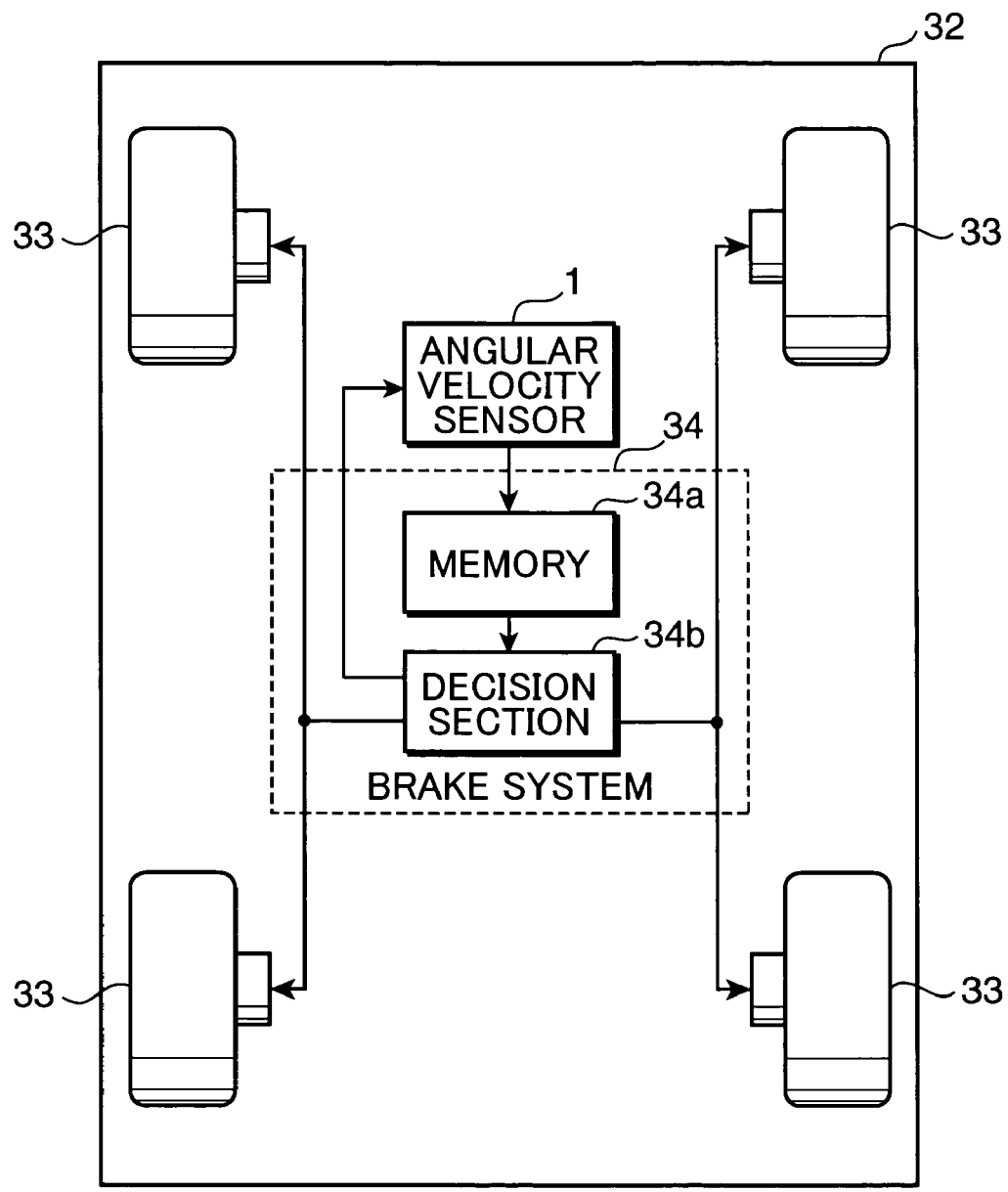
FIG. 3 is a block diagram, showing the configuration of the main part of an automobile according to a second embodiment of the present invention.

FIG. 3 is a block diagram, showing the configuration of the main part of an automobile according to a second embodiment of the present invention. An automobile 32 shown in FIG. 3 is an example of the transporting equipment, and includes an angular velocity sensor 1, wheels 33, and a brake system 34 which is an example of the control unit. The angular velocity sensor 1 shown in FIG. 3 is configured in the same way as the angular velocity sensor 1 shown in FIG. 1 and FIG. 2. Thus, a detailed description is omitted.

The brake system 34 is configured to be given an input of a signal which is obtained by accurately monitoring an output signal (i.e., the angular-velocity information) of the detection circuit 3 (see FIG. 1) of the angular velocity sensor 1, or a large number of places inside of the angular velocity sensor 1 while specifying where they are located. Then, based on such a signal, it controls the braking power of each wheel 33.

Specifically, the brake system 34 includes a memory 34a made up of an RAM and the like, and a decision section 34b made up of a microcomputer and the like. The memory 34a receives an angular-velocity signal of the second signal processing section 22 (see FIG. 1) of the angular velocity sensor 1. Then, it temporarily accumulates angular-velocity information indicated by this angular-velocity signal. Besides, the memory 34a outputs, to the decision section 34b, an output of the angular-velocity detecting element 2 (see FIG. 1) and outputs of the first and second signal processing sections 21, 22 (see FIG. 1). Incidentally, without passing through the memory 34a, these outputs may also be outputted directly from the angular velocity sensor 1 to the decision section 34b.

The decision section 34b outputs a mode setting signal to the angular velocity sensor 1. Thereby, it switches the mode one after another among the three of the angular-velocity detecting-element diagnostic mode, the processing-circuit section diagnostic mode and the ordinary mode. Hence, it controls the angular velocity sensor 1 so that the output of the angular-velocity detecting element 2 and the outputs of the first and second signal processing sections 21, 22 are outputted one by one. Besides, the decision section 34b decides whether the output of the angular-velocity detecting element 2 and the outputs of the first and second signal processing sections 21, 22 are normal or not. For example, the decision section 34b samples and takes in each output at intervals of a fixed period (e.g., 1 msec) which is created on the basis of the operation clock of a microcomputer. Every time it samples each output, it decides that each output is normal if each output is within a voltage range which is set in advance. The timing in which such a decision should be made is not limited especially to this example. Thus, it can be varied, such as making one decision every several times of sampling.

If deciding that all the outputs are normal, the decision section 34b reads the angular-velocity information accumulated temporarily in the memory 34a. Based upon this angular-velocity information, it controls the braking power of each wheel 33. On the other hand, if deciding that any output is abnormal, the decision section 34b cuts the angular-velocity information of the angular velocity sensor 1. Then, without controlling the braking power of each wheel 33, it gives a warning to turn on a predetermined warning light or execute another such. Thereby, a driver is notified that something is wrong.

As described above, in this embodiment, if deciding that all the outputs are normal, then using the normal angular-velocity information stored once in the memory 34a, the decision section 34b can control the braking power of each wheel 33. This helps make the brake system 34 more reliable and further improve the reliability of the automobile 32 itself. Besides, there is no need to provide a processing circuit which decides whether the output of the angular-velocity detecting element 2 and the outputs of the first and second signal processing sections 21, 22 is normal or not, separately in the angular velocity sensor 1. This makes it possible to miniaturize the angular velocity sensor 1 itself.

Incidentally, in this embodiment, the angular-velocity information is accumulated temporarily in the memory 34a. However, the present invention is not limited especially to this example, and thus, variations are feasible. For example, the memory 34a may also be removed. In this case, the above described decision processing is executed in predetermined timing, and if all the outputs are normal, the decision section 34b sets the angular velocity sensor 1 to the ordinary mode. Then, using the angular-velocity signal outputted in the ordinary mode, it can control the braking power of each wheel 33.

Third Embodiment

Figure 4:
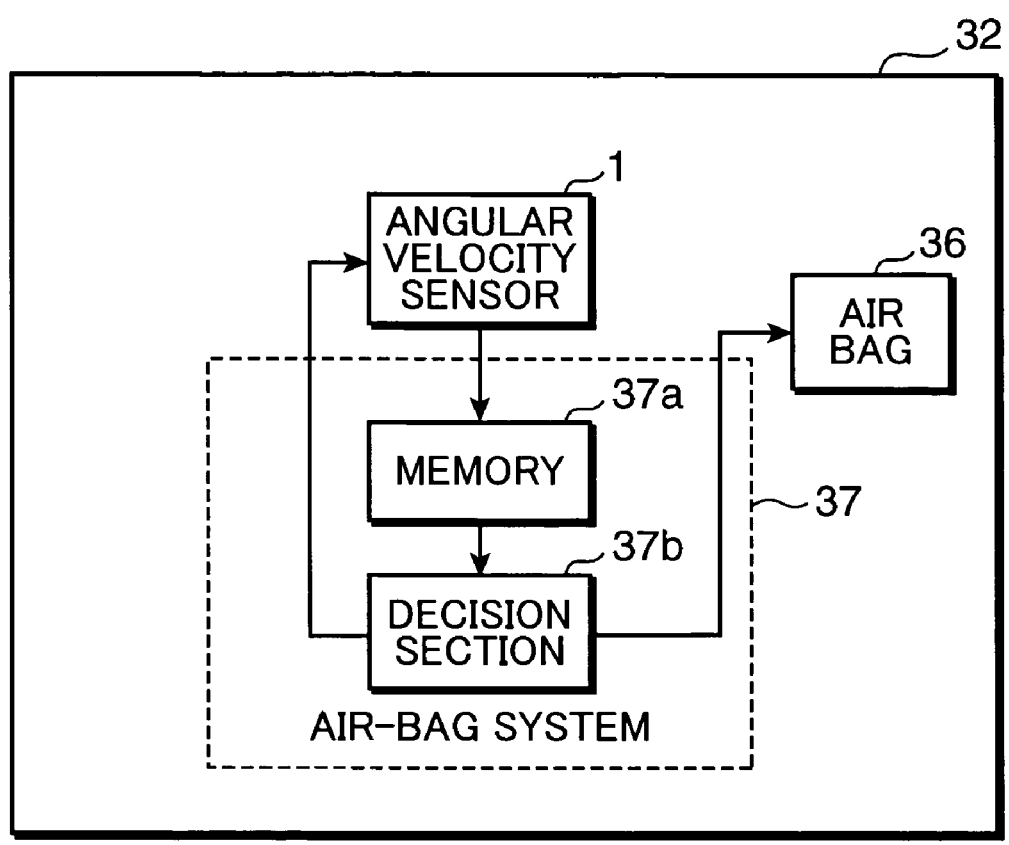
FIG. 4 is a block diagram, showing the configuration of the main part of an automobile according to a third embodiment of the present invention.
Figure 5:
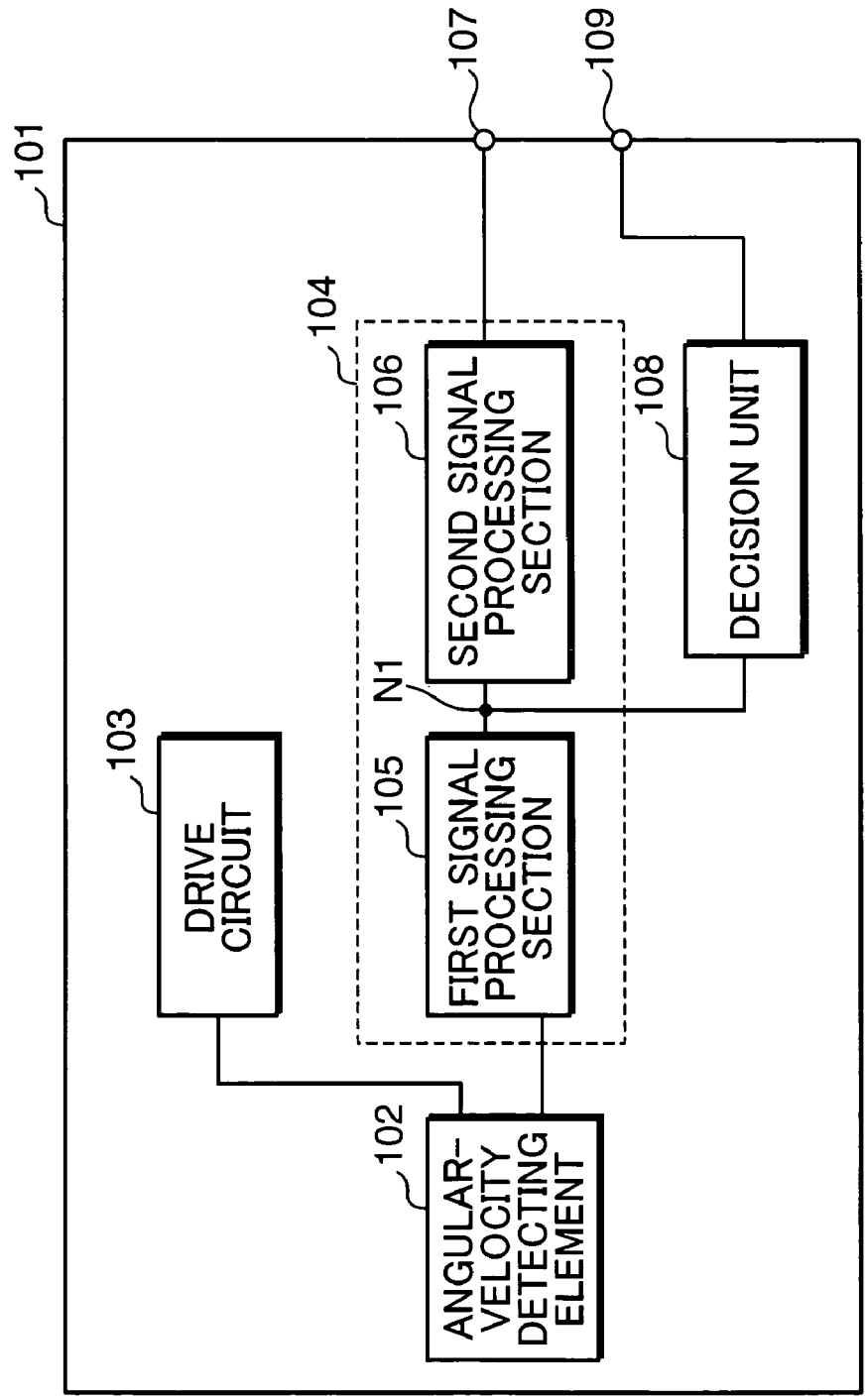
FIG. 5 is a block diagram, showing the configuration of a conventional angular velocity sensor.

FIG. 4 is a block diagram, showing the configuration of the main part of an automobile according to a third embodiment of the present invention. An automobile 32 shown in FIG. 4 is an example of the transporting equipment, and includes an angular velocity sensor 1, an air bag 36, and an air-bag system 37 which is an example of the control unit. The angular velocity sensor 1 shown in FIG. 4 is configured in the same way as the angular velocity sensor 1 shown in FIG. 1 and FIG. 2. Thus, a detailed description is omitted.

The air bag 36 is provided near at least one seat of the automobile 32, which works at the time of a crash or the like so as to protect a driver or a passenger. The air-bag system 37 is configured to be given an input of a signal which is obtained by accurately monitoring an output signal (i.e., the angular-velocity information) of the detection circuit 3 (see FIG. 1) of the angular velocity sensor 1, or a large number of places inside of the angular velocity sensor 1 while specifying where they are located. Then, based on such a signal, it controls the spread operation of the air bag 36.

Specifically, the air-bag system 37 includes a memory 37a made up of an RAM and the like, and a decision section 37b made up of a microcomputer and the like. The memory 37a receives an angular-velocity signal of the second signal processing section 22 (see FIG. 1) of the angular velocity sensor 1. Then, it temporarily accumulates angular-velocity information indicated by this angular-velocity signal. Besides, the memory 37a outputs, to the decision section 37b, an output of the angular-velocity detecting element 2 (see FIG. 1) and outputs of the first and second signal processing sections 21, 22 (see FIG. 1). Incidentally, without passing through the memory 37a, these outputs may also be outputted directly from the angular velocity sensor 1 to the decision section 37b.

The decision section 37b outputs a mode setting signal to the angular velocity sensor 1. Thereby, it switches the mode one after another among the three of the angular-velocity detecting-element diagnostic mode, the processing-circuit section diagnostic mode and the ordinary mode. Hence, it controls the angular velocity sensor 1 so that the output of the angular-velocity detecting element 2 and the outputs of the first and second signal processing sections 21, 22 are outputted one by one. Besides, the decision section 37b decides whether the output of the angular-velocity detecting element 2 and the outputs of the first and second signal processing sections 21, 22 are normal or not. For example, the decision section 37b samples and takes in each output at intervals of a fixed period (e.g., 1 msec) which is created on the basis of the operation clock of a microcomputer. Every time it samples each output, it decides that each output is normal if each output is within a voltage range which is set in advance. The timing in which such a decision should be made is not limited especially to this example. Thus, it can be varied, such as making one decision every several times of sampling.

If deciding that all the outputs are normal, the decision section 37b reads the angular-velocity information accumulated temporarily in the memory 37a. Based upon this angular-velocity information, it controls the spread operation of the air bag 36. On the other hand, if deciding that any output is abnormal, the decision section 37b cuts the angular-velocity information of the angular velocity sensor 1. Then, without controlling the air bag 36's spread operation, it gives a warning to turn on a predetermined warning light or execute another such. Thereby, a driver is notified that something is wrong.

As described above, in this embodiment, if deciding that all the outputs are normal, then using the normal angular-velocity information stored once in the memory 37a, the decision section 37b can control the air bag 36's spread operation. This helps make the air-bag system 37 more reliable and further improve the reliability of the automobile 32 itself. Besides, there is no need to provide a processing circuit which decides whether the output of the angular-velocity detecting element 2 and the outputs of the first and second signal processing sections 21, 22 is normal or not, separately in the angular velocity sensor 1. This makes it possible to miniaturize the angular velocity sensor 1 itself.

Incidentally, in this embodiment, the angular-velocity information is accumulated temporarily in the memory 37a. However, the present invention is not limited especially to this example, and thus, variations are feasible. For example, the memory 37a may also be removed. In this case, the above described decision processing is executed in predetermined timing, and if all the outputs are normal, the decision section 37b sets the angular velocity sensor 1 to the ordinary mode. Then, using the angular-velocity signal outputted in the ordinary mode, it can control the air bag 36's spread operation.

Furthermore, in the above described second and third embodiments, the brake system 34 and the air-bag system 37 are given as separate ones. However, a single ECU may also realize the functions of a brake system and an air-bag system. In addition, the control unit for which the angular velocity sensor according to the present invention can be used is not limited especially to each such example as described above. Hence, it can be applied similarly to various control units used for transporting equipment, offering the same advantages.

INDUSTRIAL APPLICABILITY

The angular velocity sensor according to the present invention can monitor a signal at each of many places inside of it while specifying where they are located. At the same time, it becomes smaller so that the integration of such sensors can be realized. It is useful as an angular velocity sensor which detects an angular velocity, and the like. If the corresponding angular velocity sensor is used for transporting equipment, the whole transporting equipment becomes far more reliable. Hence, it can be used for transporting equipment such as an automobile.

The invention claimed is:

1. An angular velocity sensor, comprising:
    an angular-velocity detecting element which outputs a detection signal;
    a drive circuit which drives the angular-velocity detecting element;
    a detection circuit which processes the detection signal outputted from the angular-velocity detecting element according to an applied angular velocity and creates an angular-velocity signal;
    a plurality of internal signal output points;
    an output terminal;
    a switch circuit which is connected between the output terminal and the plurality of internal signal output points; and
    a control circuit which controls a connection operation of the switch circuit,
    wherein:
    the detection circuit comprises:
        a first signal processing section which processes the detection signal outputted from the angular-velocity detecting element, and
        a second signal processing section which processes an output signal of the first signal processing section and outputs the angular-velocity signal;
    the plurality of internal signal output point comprises an output point of the angular velocity detecting element, an output point of the first signal processing section, and an output point of the second signal processing section; and
    the switch circuit connects, to the output terminal, a signal output point selected out of the signal output point of the angular-velocity detecting element, the signal output point of the first signal processing section, and the signal output point of the second signal processing section according to a control signal of the control circuit;
    the switch circuit comprises:
        a first switch which connects the signal output point of the angular-velocity detecting element and the output terminal,
        a second switch which connects the signal output point of the first signal processing section and the output terminal, and
        a third switch which connects the signal output point of the second signal processing section and the output terminal; and
    the control circuit comprises:
        a voltage generator which generates a predetermined command voltage;
        a first comparator which receives a command voltage generated from the voltage generator at a first input terminal and receives a first reference voltage at a second input terminal, and compares the command voltage and the first reference voltage;
        a second comparator which receives a command voltage generated from the voltage generator at the first input terminal and receives a second reference voltage higher than the first reference voltage at the second input terminal, and compares the command voltage and the second reference voltage;
        an AND gate which receives an output of the first and second comparators;
        a first NOR gate which receives an output of the first and second comparators;
        an inverter which inverts the output of the first comparator; and
        a second NOR gate which receives an output of the inverter and an output of the second comparator.

2. The angular velocity sensor according to claim 1, wherein:
    the first to third switches are each formed by an inverter, a P-channel transistor and an N-channel transistor.

3. The angular velocity sensor according to claim 1, wherein:
    the first switch connects the signal output point of the angular-velocity detecting element and the output terminal according to an output of the AND gate;
    the second switch connects the signal output point of the first signal processing section and the output terminal according to an output of the second NOR gate; and
    the third switch connects the signal output point of the second signal processing section and the output terminal according to an output of the first NOR gate.

4. The angular velocity sensor according to claim 3, wherein the voltage generator: outputs a command voltage lower than each first and second reference voltage to the first and second comparators when the angular-velocity signal is monitored; outputs a command voltage higher than the first reference voltage and lower than the second reference voltage to the first and second comparators when an output signal of the first signal processing section is monitored; and outputs a command voltage higher than each first and second reference voltage to the first and second comparators when the detection signal is monitored.

5. A transporting equipment, including:
the angular velocity sensor according to claim 1; and
a control unit which decides whether an output signal from a plurality of points inside of the angular velocity sensor is abnormal, and if deciding that the output signal is normal, controls the angular velocity sensor so that an angular-velocity signal of the angular velocity sensor is supplied to the output terminal.

6. The transporting equipment according to claim 5, wherein:
the control unit comprises:
a memory in which angular-velocity information indicated by an angular-velocity signal supplied from the output terminal of the angular velocity sensor is temporarily accumulated, and
a decision section which decides whether an output signal from the plurality of points inside of the angular velocity sensor is abnormal; and
if the decision is made that the output signal is normal, the decision section controls the transporting equipment using angular-velocity information accumulated in the memory.

7. The transporting equipment according to claim 5, wherein:
the control unit outputs, to the control circuit, a mode setting signal for selecting a signal output point out of the plurality of internal signal output points; and
the control circuit outputs a control signal for controlling the connection operation of the switch circuit according to the mode setting signal.

8. The transporting equipment according to claim 5, wherein the control unit is a brake system which controls the braking power of a wheel.

9. The transporting equipment according to claim 8, wherein:
the brake system includes,
a memory in which angular-velocity information indicated by an angular-velocity signal supplied from the output terminal of the angular velocity sensor is temporarily accumulated, and
a decision section which decides whether an output signal from the plurality of points inside of the angular velocity sensor is abnormal; and
if the decision is made that the output signal is normal, the decision section controls the braking power of a wheel using angular-velocity information accumulated in the memory.

10. The transporting equipment according to claim 5, wherein the control unit is an air-bag system which controls the spread operation of an air bag.

11. The transporting equipment according to claim 10, wherein:
the air-bag system includes,
a memory in which angular-velocity information indicated by an angular-velocity signal supplied from the output terminal of the angular velocity sensor is temporarily accumulated, and
a decision section which decides whether an output signal from the plurality of points inside of the angular velocity sensor is abnormal; and
if the decision is made that the output signal is normal, the decision section controls the spread operation of an air bag using angular-velocity information accumulated in the memory.

12. The transporting equipment according to claim 5, wherein the plurality of points inside of the angular velocity sensor comprises one or more of the plurality of internal signal output points.

* * * * *